Feb. 6, 1951 L. SIANO 2,540,460
MIXING VALVE
Filed May 24, 1946 2 Sheets-Sheet 1
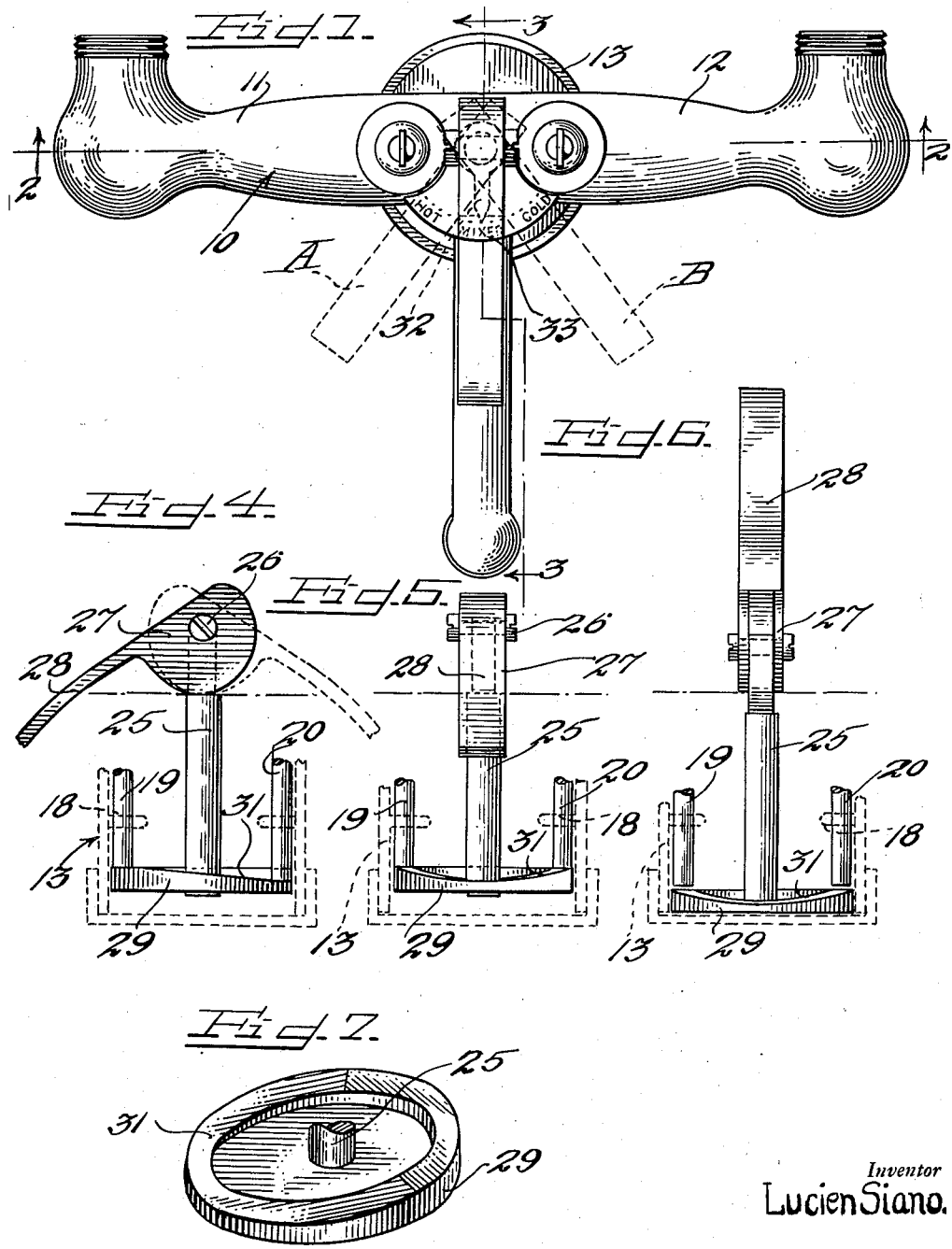
Inventor
Lucien Siano.
By Clarence A. O'Brien
and Harvey B. Jacobson
Attorneys

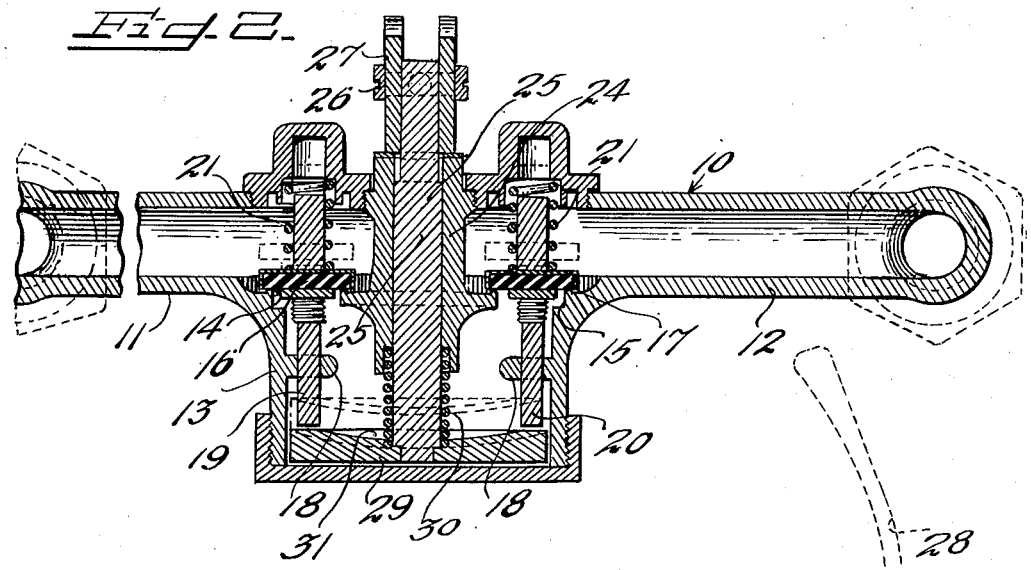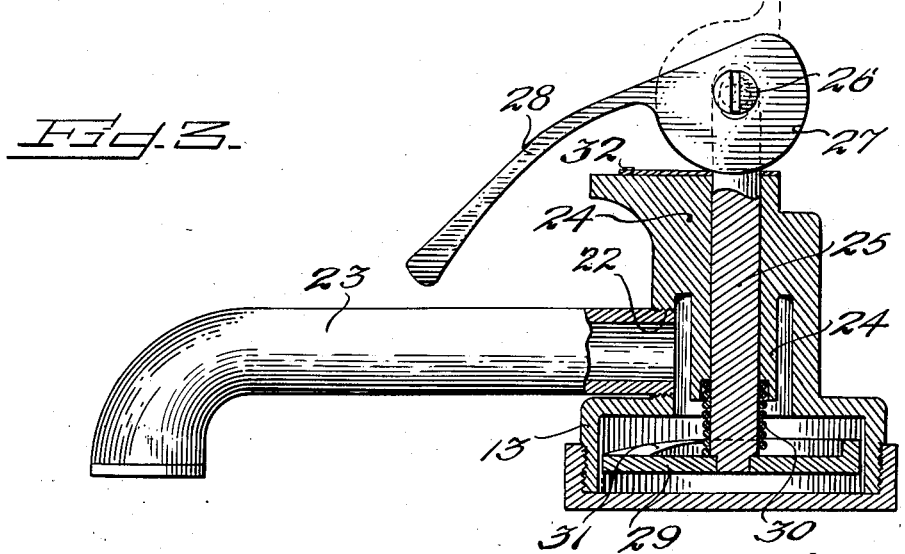

Patented Feb. 6, 1951

2,540,460

UNITED STATES PATENT OFFICE 2,540,460

MIXING VALVE

Lucien Siano, Ballston Spa, N. Y.

Application May 24, 1946, Serial No. 671,965

1 Claim. (Cl. 277—20)

This invention relates to a mixing valve and has for its primary object to introduce fluids in proper quantity from separate sources of supply into a mixing chamber, and discharging the mixture therefrom.

Another object is to regulate the quantity of fluid entering the mixing chamber, and to establish the flow of fluids from the sources of supply and to so set the valve that once the desired mixture has been established the valve may be opened and closed repeatedly with assurance that the mixture will remain unchanged irrespective of the number of cycles that may be involved in the opening and closing of the valve.

A further object is to regulate at will the mixture of the fluids.

The above and other objects may be attained by employing this invention which embodies among its features a valve body having a mixing chamber, a discharge port communicating with said mixing chamber through which fluid mixed in said chamber is adapted to be discharged, said valve body having spaced inlet ports opening into the mixing chamber, a valve normally closing each inlet port, a valve stem for opening each valve, means operable from the exterior of the mixing chamber to open the valves and means on said last named means selectively to regulate the magnitude of movement of the valve stems whereby the degree to which the valves open is controlled.

Other features include a plunger movable longitudinally through the mixing chamber, a handle on the outer end of the plunger for regulating its longitudinal movement, said plunger also being rotatable about its longitudinal axis under the influence of the handle, a disc on the plunger operable in unison therewith and a cam face on the disc for engaging the valve stems to regulate the magnitude of movement thereof when the plunger is moved longitudinally of the chamber and thus regulate the degree to which the valves open.

Other features include a dial on the handle for indicating the position of the cam face on the disc so as to enable the user to govern the position of the disc and hence the mixture issuing from the discharge port of the mixing chamber by adjusting the handle to the desired point.

In the drawings:

Figure 1 is a top plan view of the valve embodying the features of this invention, showing the same designed for use with a conventional hot and cold water system, Figure 2 is a vertical sectional view taken substantially along the line 2—2 of Figure 1, showing the interior valve mechanism, Figure 3 is a transverse sectional view taken substantially along the line 3—3 of Figure 1, Figure 4 is a diagrammatic view showing the plunger and control disc in one position with relation to the valve stems, Figure 5 is a view similar to Figure 4 showing the disc plunger and handle in another position, with the valves open, Figure 6 is a view similar to Figure 5 showing the valve closed, and Figure 7 is a perspective view of the valve plunger controlling disc.

Referring to the drawings in detail, a valve body designated generally 10 comprises a pair of arms 11 and 12 which are adapted to be connected in any conventional manner to two separate sources of fluid supply. These arms 11 and 12 extend radially from a mixing chamber 13 and have communications therewith, respectively, through valve ports 14 and 15, which are normally closed by spring pressed valves 16 and 17, respectively. Projecting inwardly into the mixing chamber 13 are guide brackets 18 which are pierced to receive valve stems 19 and 20 by means of which the valves 16 and 17, respectively are adapted to be opened against the pressure of their respective springs 21. The mixing chamber communicates through a discharge port 22 with a discharge nozzle 23 which for the sake of illustration is disclosed as an ordinary faucet.

Formed in the valve body and extending axially of the mixing chamber 13 is a tubular guide 24 through which a plunger 25 is mounted to slide axially, and to rotate. Pivotally connected to the end of the plunger 25 which projects beyond the valve body as at 26 is a cam or eccentric 27 carrying a handle 28 by means of which the eccentric may be rotated around its pivot 26. The eccentric 27 bears on the valve body in such a manner that when it is rotated around its pivot 26 by means of the handle 28 the plunger 25 will be moved longitudinally through the guide 24 toward the outer end of the valve body. In order to urge the plunger inwardly and to actuate the valve stems 19 and 20 a disc 29 is secured to the inner end of the plunger, i. e., the end disposed within the mixing chamber, and surrounding the plunger and bearing against the disc and the guide 24 is a compression coil spring 30. It will thus be seen that the disc 29 will normally be urged out of contact with the valve stems 19 and 20, and the plunger 25 will be urged to enter the valve body.

Formed on the face of the disc which is disposed toward the ends of the valve stems 19 and 20 is a cam face 31 which, when the plunger is moved under the influence of the eccentric 27, is adapted to engage the ends of the valve stems 19 and 20. This cam face 31 is so arranged that by rotating the handle 28 about the longitudinal axis of the plunger 25 the magnitude of movement of the valve stems 19 and 20 may be varied and consequently the degree to which the valves 16 and 17 open may be controlled. In order to give the user an indication as to the position of the cam face 31 with relation to the valve stems 19 and 20 and indicator 32 is attached to the plunger 25 to cooperate with indices 33 formed on the exterior of the valve body.

In operation, it will be understood that the arms 11 and 12 are connected to suitable sources of fluid supply, such as the hot and cold system of a dwelling. When it is desired to deliver a mixture of equally hot and cold water through the nozzle 23 the handle 28 is turned into the position illustrated in full lines in Figure 1 with the indicator 32 pointing to "mixed" on the valve body. This will cause the cam face 31 to assume the position illustrated in Figure 5 so that when the handle 28 is rotated about the pivot 26 the eccentric 27 will bear on the outside of the valve body and cause the plunger to elevate the disc 29 so as to move the valve stems 19 and 20 simultaneously for the same distance, thus opening the valves 16 and 17 an equal amount so as to permit the incoming fluid to mix in the chamber in uniform volume. Should it be desired to increase the temperature of the mixture, the handle 28 may be turned into the position A in Figure 1, thus causing the disc 29 to rotate so as to elevate the valve stem 19 while lowering the valve stem 20. In this way a greater volume of fluid will be admitted to the valve 16 than that which is admitted through the valve 17, so that a hotter fluid will be delivered through the nozzle 23. By moving the handle into the dotted line position B in Figure 1, the reverse will take place and when it is desired to discontinue the flow the handle 28 is rotated about the pivot 26 to permit the spring 30 to retract the plunger 25.

While in the foregoing there has been shown and described the preferred embodiment of this invention it is to be understood that minor changes in the details of construction, combination, and arrangement of parts may be resorted to without departing from the spirit and scope of the invention as claimed.

I claim:

A mixing valve comprising a body forming a mixing chamber having an open bottom and a solid top, a pair of inlet ports in said body at the top of said chamber upon opposite sides of the chamber, a discharge port opening out of said chamber, a tubular plunger guide extending downwardly into the mixing chamber axially thereof between said inlet ports and terminating short of the bottom of said chamber, spring loaded upwardly opening valves for closing said inlet ports having vertical stems extending downwardly into said chamber and upwardly movable to open said valves, a valve operating plunger extending downwardly through said guide into the bottom of said chamber, said plunger being rotatable and vertically movable in said guide, a cam disk on the lower end of the plunger in the bottom of the chamber movable upwardly to correspondingly move said stems and valves upon upward movement of said plunger, and being rotatable by rotation of said plunger to differentially move said stems and valves upwardly, a spring surrounding said plunger and bearing against said disk and the lower end of said guide to oppose upward movement of said plunger and disk, manipulating means on the upper end of said plunger for rotating the same comprising a cam lever operative against the top of said body to cam said plunger upwardly, and a closure cap for the bottom of said chamber removable for access to said chamber and the disk therein.

LUCIEN SIANO.

REFERENCES CITED

The following references are of record in the file of this patent:

UNITED STATES PATENTS

| Number | Name | Date |
| --- | --- | --- |
| 1,095,003 | Leonard | Apr. 28, 1914 |
| 1,280,616 | Lawler | Oct. 1, 1918 |
| 1,573,210 | Whidden | Feb. 16, 1926 |
| 2,322,157 | Porter | June 15, 1943 |
| 2,334,990 | Brown | Nov. 23, 1943 |

FOREIGN PATENTS

| Number | Country | Date |
| --- | --- | --- |
| 362,112 | Italy | Aug. 12, 1938 |